(12) United States Patent
Schropp, Jr.

(10) Patent No.: US 9,804,717 B2
(45) Date of Patent: Oct. 31, 2017

(54) INPUT SENSING AND EXCLUSION

(71) Applicant: Synaptics Incorporated, San Jose, CA (US)

(72) Inventor: Donald R. Schropp, Jr., Sunnyvale, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/645,224

(22) Filed: Mar. 11, 2015

(65) Prior Publication Data

US 2016/0266674 A1    Sep. 15, 2016

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0418* (2013.01); *G06F 3/0488* (2013.01); *G06F 2203/04104* (2013.01); *G06F 2203/04808* (2013.01)

(58) Field of Classification Search
CPC ...... G06F 3/0346; G06F 3/0416; G06F 3/044; G06F 3/048; G06F 3/0487–3/04886; G06F 2203/04104; G06F 2203/04106; G06T 7/004–7/0048
See application file for complete search history.

(56) References Cited

U.S. PATENT DOCUMENTS

| | | |
|---|---|---|
| 3,846,755 A | 11/1974 | Hart |
| 4,782,328 A | 11/1988 | Denlinger |
| 4,782,339 A | 11/1988 | Zeising et al. |
| 4,783,829 A | 11/1988 | Miyakawa et al. |
| 5,335,298 A | 8/1994 | Hevenor et al. |
| 5,485,568 A | 1/1996 | Venable et al. |
| 5,510,813 A | 4/1996 | Makinwa et al. |
| 5,892,854 A | 4/1999 | De Queiroz et al. |
| 5,969,339 A | 10/1999 | McMurray et al. |
| 6,201,888 B1 | 3/2001 | Kalvin |
| 6,392,686 B1 | 5/2002 | Kao et al. |
| 7,374,490 B2 | 5/2008 | Tahara et al. |
| 7,440,588 B2 | 10/2008 | Kaneko et al. |
| 7,526,140 B2 | 4/2009 | Fang et al. |
| 7,593,000 B1 | 9/2009 | Chin |
| 7,619,618 B2 | 11/2009 | Westerman et al. |
| 7,736,235 B2 | 6/2010 | Tahara et al. |
| 7,764,274 B2 | 7/2010 | Westerman et al. |
| 7,812,828 B2 | 10/2010 | Westerman et al. |
| 7,835,568 B2 | 11/2010 | Park et al. |
| 7,864,161 B2 | 1/2011 | Hollemans et al. |
| 7,916,126 B2 | 3/2011 | Westerman et al. |
| 7,962,311 B2 | 6/2011 | Launay et al. |
| 7,986,311 B2 | 7/2011 | Lapstun et al. |
| 8,009,936 B2 | 8/2011 | Oosawa et al. |
| 8,228,305 B2 | 7/2012 | Pryor |
| 8,284,166 B2 | 10/2012 | Taylor et al. |
| 8,335,996 B2 | 12/2012 | Davidson et al. |

(Continued)

*Primary Examiner* — Nathan Danielsen
(74) *Attorney, Agent, or Firm* — Osha Liang LLP

(57) ABSTRACT

In a method of input sensing and exclusion, an input is detected within a sensing region of an input device. It is determined that the input is along an edge of the input device. It is then determined whether the input satisfies exclusion criteria. Responsive to satisfaction of the exclusion criteria, the input is excluded from consideration as valid input.

16 Claims, 10 Drawing Sheets

(56) References Cited

U.S. PATENT DOCUMENTS

| | | |
|---|---|---|
| 8,564,551 B2 | 10/2013 | Park et al. |
| 8,577,644 B1* | 11/2013 | Ksondzyk ............. G06F 3/0414 345/173 |
| 2005/0159223 A1 | 7/2005 | Tahara et al. |
| 2005/0164794 A1 | 7/2005 | Tahara |
| 2007/0248268 A1 | 10/2007 | Wood |
| 2007/0252821 A1 | 11/2007 | Hollemans et al. |
| 2008/0100593 A1* | 5/2008 | Skillman ................. G06F 3/042 345/175 |
| 2008/0153601 A1 | 6/2008 | Tahara et al. |
| 2008/0158193 A1 | 7/2008 | Lapstun et al. |
| 2008/0240494 A1 | 10/2008 | Oosawa et al. |
| 2008/0252615 A1 | 10/2008 | Shipton |
| 2008/0309629 A1 | 12/2008 | Westerman et al. |
| 2009/0095540 A1 | 4/2009 | Zachut et al. |
| 2009/0174679 A1* | 7/2009 | Westerman ............. G06F 3/041 345/173 |
| 2009/0300531 A1 | 12/2009 | Pryor |
| 2010/0103133 A1 | 4/2010 | Park et al. |
| 2010/0189320 A1 | 7/2010 | Dewaele |
| 2010/0201631 A1 | 8/2010 | Taylor et al. |
| 2010/0259504 A1 | 10/2010 | Doi et al. |
| 2011/0260994 A1 | 10/2011 | Saynac et al. |
| 2011/0310040 A1 | 12/2011 | Ben-Shalom et al. |
| 2012/0062474 A1* | 3/2012 | Weishaupt ............. G06F 3/044 345/173 |
| 2012/0146939 A1 | 6/2012 | Worfolk et al. |
| 2012/0242594 A1* | 9/2012 | Matsumoto ........... G06F 3/0488 345/173 |
| 2012/0287076 A1* | 11/2012 | Dao ....................... G06F 3/0416 345/174 |
| 2013/0207913 A1* | 8/2013 | Takashima ............. G06F 3/044 345/173 |
| 2014/0132562 A1* | 5/2014 | Miyamoto ............. G06F 3/044 345/174 |
| 2014/0184572 A1* | 7/2014 | Ito ........................ G06F 3/0418 345/178 |
| 2014/0362001 A1 | 12/2014 | Benbasat et al. |

\* cited by examiner

INPUT SENSING AND EXCLUSION

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

According to some embodiments of a method of input sensing and exclusion, an input is detected within a sensing region of an input device. It is determined that the input is along an edge of the input device. It is then determined whether the input satisfies exclusion criteria. Responsive to satisfaction of the exclusion criteria, the input is excluded from consideration as valid input.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Various examples herein are illustrated and discussed with respect to capacitive sensing and a capacitive sensing input device, however, it should be appreciated that other input detection techniques and input devices may be similarly employed with the techniques and methods discussed herein. An input device such as a touch screen is typically disposed as part of a face of an electronic device or system, such as a tablet computer, that uses it. Because of this, a user may hold the electronic device on one or more edges in a manner that causes a grip or grips of the user to overlap the input device. Conventionally, such an overlapping grip is registered as one or more inputs even. Utilizing techniques described herein, efficiencies may be achieved excluding certain inputs that are detected by an input device from being considered as valid inputs. For example, the input devices, processing systems, and methods discussed herein facilitate grip detection and exclusion. That is, a palm or palm and thumb that are gripping along the edge of an input device can be detected and excluded from being considered as valid input, while, at the same time, other inputs are detected and treated as valid.

Discussion begins with a description of an example input device with which or upon which various embodiments described herein may be implemented. An example sensor electrode pattern is then described. This is followed by description of an example processing system and some components thereof which may be employed for input detection and exclusion. The processing system may be utilized with or as a portion of an input device, such as a capacitive sensing input device. Several examples of input detection and exclusion are depicted and described. Operation of the input devices, processing systems, and components thereof are then further described in conjunction with description of an example method of input detection and exclusion.

Example Input Device

Figure 1:
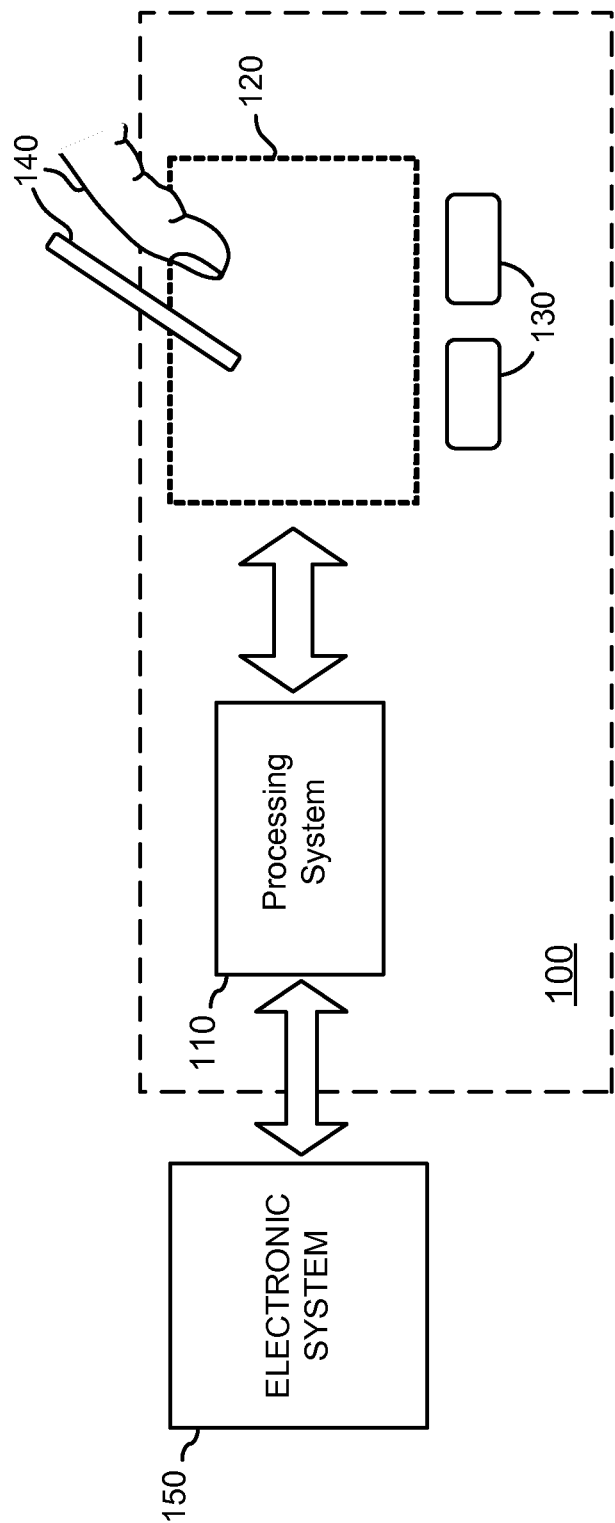
FIG. 1 is a block diagram of an example input device, in accordance with embodiments.

Turning now to the figures, FIG. 1 is a block diagram of an example input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in the sensing region 120. Input device 100 comprises one or more sensing elements for detecting user input. As several non-limiting examples, input device 100 may use acoustic, ultrasonic, capacitive, elastive, resistive, inductive, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, in some embodiments, the resulting signal represents noise detected in the operating environment of sensing region 120. In other embodiments, where an intentional external transmitter, such as an active pen, is utilized the resulting signal results from signals transmitted from this intentional transmitter.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor modules configured to operate sensing element(s) or other structures to detect input and determination modules configured to determine positions of any inputs objects detected. For example, a sensor module may perform one or more of absolute capacitive sensing and transcapacitive sensing to detect inputs, and a determination module may determine positions of inputs based on the detected capacitances or changes thereto. In some embodiments, other modules or functionality may be included in processing system 110; for example, an identification module may be included and configured to identify gestures from detected inputs.

In some embodiments, processing system 110 responds to user input (or lack of user input) in sensing region 120 directly by causing one or more actions. Example actions include changing operation modes, as well as Graphic User Interface (GUI) actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. "Zero-dimensional" positional information includes near/far or contact/no contact information. "One-dimensional" positional information includes positions along an axis. "Two-dimensional" positional information includes motions in a plane. "Three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically-readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
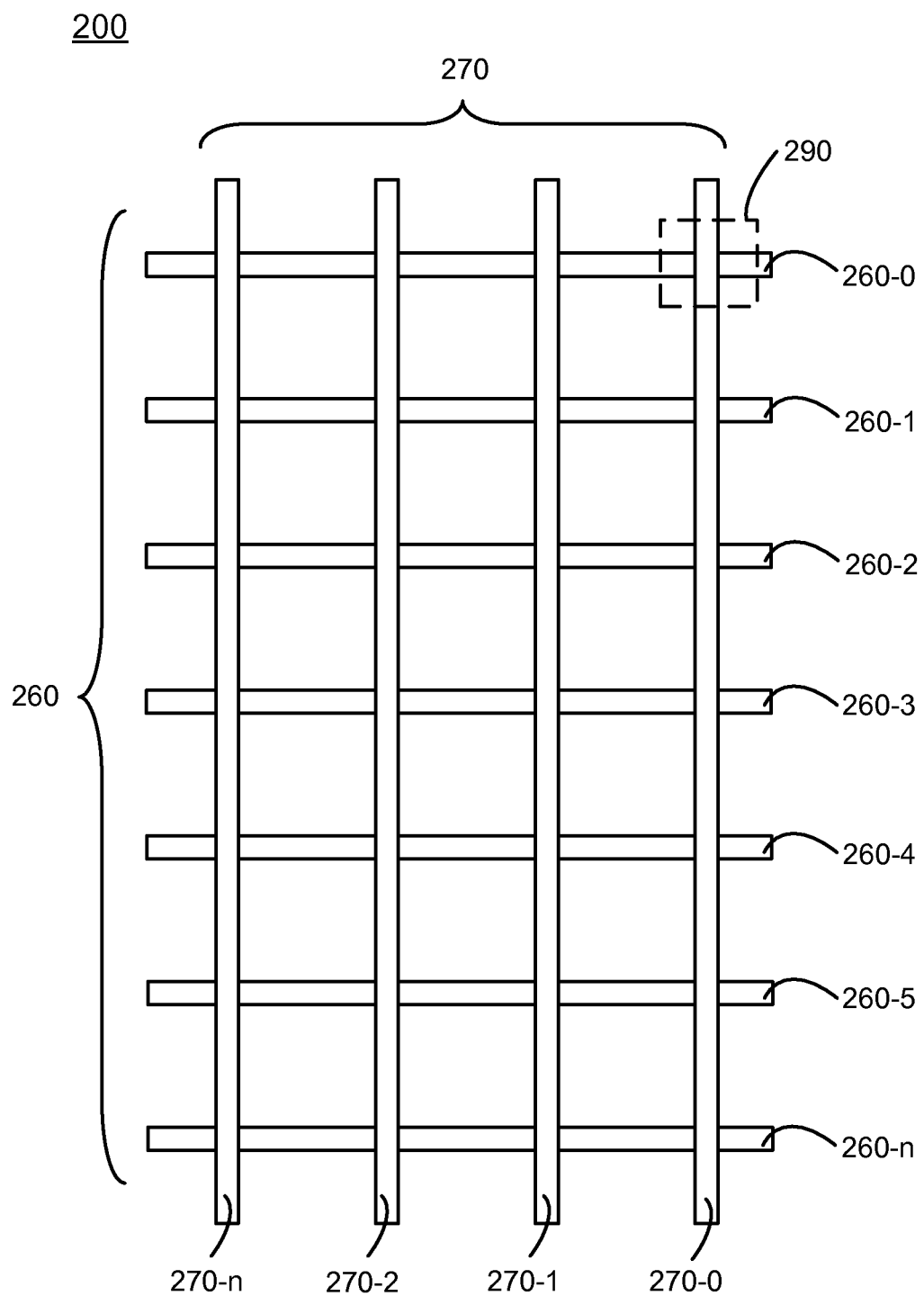
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed with the techniques described herein, including but not limited to: patterns with a single sensor electrode, patterns with a single set of sensor electrodes, patterns with two sets of sensor electrodes disposed in a single layer (without overlapping), patterns with two sets of sensor electrodes disposed in a single layer employing jumpers at crossover regions between sensor electrodes, patterns that utilize one or more display electrodes of a display device such as one or more segments of a common voltage ($V_{COM}$) electrode, source electrodes, gate electrodes, anode electrodes and cathode electrodes, and patterns that provide individual button electrodes. The illustrated sensor electrode pattern is made up of a first plurality of sensor electrodes 270 (270-0, 270-1, 270-2 . . . 270-$n$) and a second plurality of sensor electrodes 260 (260-0, 260-1, 260-2 . . . 260-$n$) which overlay one another, in this example. In many embodiments, processing system 110 is configured to operate the second plurality of sensor electrodes 260 as transmitter electrode by driving them with transmitter signals and the first plurality of sensor electrodes 270 as receiver electrodes by receiving resulting signals with them. In the illustrated example, sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, sensor electrode 270-0 may be charged and then the capacitance of sensor electrode 270-0 may be measured. In such an embodiment, an input object 140 interacting with sensor electrode 270-0 alters the electric field near sensor electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Background capacitance, $C_B$, is the capacitive image of a sensor pattern or the absolute capacitance measured on a sensor electrode with no input object in the sensing region of a sensor electrode pattern. The background capacitance changes with the environment and operating conditions.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

Example Processing System

Figure 3:
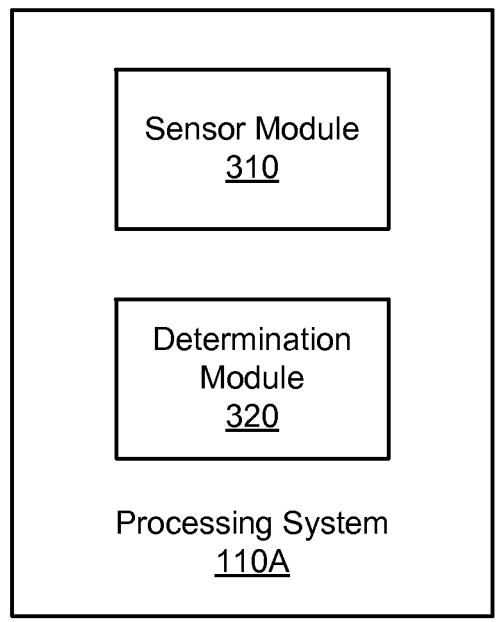
FIG. 3 illustrates a block diagram of some components of an example processing system that may be utilized with an input device, according to various embodiments.

FIG. 3 illustrates a block diagram of some components of an example processing system 110A that may be utilized with a capacitive sensing input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more transmitter electrode(s) and receiver electrode(s) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

Sensor module 310 comprises sensor circuitry and operates to interact with the sensor electrodes, of a sensor electrode pattern, that are utilized to generate a sensing region 120. This includes operating a first plurality of sensor electrodes (e.g., sensor electrodes 260) to be silent, to be driven with a transmitter signal, to be used for transcapacitive sensing, and/or to be used for absolute capacitive sensing. This also includes operating a second plurality of sensor electrodes (e.g., sensor electrodes 270) to be silent, to be driven with a transmitter signal, to be used for transcapacitive sensing, and/or to be used for absolute capacitive sensing.

Sensor module 310 is configured to acquire transcapacitive resulting signals by transmitting with a first one of a plurality of sensor electrodes of the input device and receiving with a second one of the plurality of sensor electrodes. During transcapacitive sensing, sensor module 310 operates to drive or transmit transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signals may be coded according to a code. The code may be altered, such as lengthening or shortening the code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. It is appreciated that sensor module 310 may, in a similar fashion, transmit transmitter signals on one or more of sensor electrodes 270 and receive corresponding resulting signals on one or more of sensor electrodes 260.

In absolute capacitive sensing, a sensor electrode is both driven and used to receive a resulting signal that results from the signal driven on to the sensor electrode. In this manner, during absolute capacitive sensing, sensor module 310 operates to drive a signal on to and receive a signal from one or more of sensor electrodes 260 or 270. During absolute capacitive sensing, the driven signal may be referred to as an absolute capacitive sensing signal, transmitter signal, or modulated signal, and it is driven through a routing trace that provides a communicative coupling between processing system 110A and the sensor electrode(s) with which absolute capacitive sensing is being conducted.

In many embodiments sensor module 310 includes one or more amplifiers. Such an amplifier may be interchangeably referred to as an "amplifier," a "front-end amplifier," a "receiver," an "integrating amplifier," a "differential amplifier," or the like, and operates to receive a resulting signal at an input and provide an integrated voltage as an output. The resulting signal is from one or more sensor electrodes of a sensor electrode pattern, such as sensor electrode pattern 200. A single amplifier may be coupled with and used to receive a resulting signal from exclusively from a single sensor electrode, may receive signals from multiple sensor electrodes that are simultaneously coupled with the amplifier, or may receive signals from a plurality of sensor electrodes that are coupled one at a time to the amplifier. A sensor module 310 may include multiple amplifiers utilized in any of these manners. For example, in some embodiments, a first amplifier may be coupled with a first sensor electrode while a second amplifier is coupled with a second sensor electrode.

Determination module 320 may be implemented as hardware (e.g., hardware logic and/or other circuitry) and/or as a combination of hardware and instructions stored in a non-transitory manner in a computer readable storage medium.

Determination module 320 operates to compute/determine a measurement of a change in a transcapacitive coupling between a first and second sensor electrode during transcapacitive sensing. Determination module 320 then uses such measurements to determine the positional information comprising the position of an input object (if any) with respect to sensing region 120. The positional information can be determined from a transcapacitive image. The transcapacitive image is determined by determination module 320 based upon resulting signals acquired by sensor module 310. The resulting signals are used as or form capacitive pixels representative of input(s) relative to sensing region 120. It is appreciated that determination module 320 operates to decode and reassemble coded resulting signals to construct a transcapacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. With respect to the techniques described herein, determination module 320 operates to determine an absolute capacitance of the sensor electrode (e.g., sensor electrode 270-0) after a sensing signal has been driven on the sensor electrode.

In some embodiments, processing system 110A comprises decision making logic which directs one or more portions of processing system 110A, such as sensor module 310 and/or determination module 320, to operate in a selected one of a plurality of different operating modes based on various inputs.

In accordance with embodiments herein, determination module 320 is also configured to detect an input within the transcapacitive image. Although, the techniques are discussed below with reference to transcapacitive sensing examples, they may similarly be applied to embodiments configured to acquire absolute capacitive sensing signals to form an absolute capacitive image. Determination module 320 analyzes the locations and intensity of the capacitive pixels in a transcapacitive image to detect an input and determine its position relative to sensing region 120 of an input device 100. FIGS. 4A-7C visually depict some examples of transcapacitive images. Once inputs in a transcapacitive image are detected, in accordance with embodiments described herein, determination module 320 operates to determine if any of the detected inputs should be excluded from consideration as a valid user input. To do this, determination module 320 determines if any of the detected inputs satisfy exclusion criteria which would indicate that they should be excluded. For example, if an input abuts an edge of sensing region 120 of an input device 100 or begins within certain distance or certain number of pixels of an edge of sensing region 120, it is screened against two or more exclusion criteria. In one embodiment, determination module 320 determines whether the input exceeds a minimum size criterion (e.g., an area greater than a preset number of capacitive pixels) and determines whether the aspect ratio is at or higher than a preset aspect ratio criterion. Aspect ratio, as described herein, is a ratio of semi-major axis to semi-minor axis regardless of orientation of the axes. The span of an axis may be measured in distance, such as centimeters or millimeters, or in some other unit such as pixels spanned. An aspect ratio of 1 represents a circle or square while an aspect ratio of infinity would represent a line. For example, in one embodiment, a size above 15 square pixels meets the size criterion for exclusion and an aspect ratio above 1.5 meets the aspect ratio criterion for exclusion. In one embodiment, in response to an input satisfying both a minimum size criterion and an aspect ratio criterion, determination module 320 excludes the input from consideration as a valid input.

In another embodiment, determination module 320 utilizes additional exclusion criteria in addition to the two previously described. For example, a centroid of the input may be determined by determination module 320. Determination module 320 will then determine if the centroid falls within an exclusion zone starting at the edge and moving inward a certain distance or number of capacitive pixels. For example, in one embodiment, a size above 14 square pixels meets the size criterion for exclusion, an aspect ratio above 1.4 and below 1.8 meets the aspect ratio criterion for exclusion, and having a centroid located within an exclusion zone measuring 5 pixels wide from the edge of sensing region 120 meets a centroid location criterion associated with an exclusion zone along the edge. In one embodiment, in response to an input satisfying all three of these exclusion criteria, determination module 320 excludes an input from consideration as a valid input.

In some embodiments, determination module 320 acquires device orientation information, such as from accelerometers or other sensors of an electronic system 150 in which processing system 110 is utilized. Determination module 320 then determines which edges of input device 100 are considered to be the top, bottom, left and right. For example, the orientation of graphics on a display of the electronic device may drive the labeling of top, bottom, left, and right when a touch sensor and display are utilized together as a touch screen. Determination module, may establish one or more exclusion zones (e.g., on edges labeled left and right; on edges labeled top and bottom; or on edges labeled left, right, top and bottom). With respect to any established exclusion zone, determination module 320 may also establish parameters such as width of the exclusion zone in capacitive pixels or some other measure from an edge of sensing region 120 of input device 100. In some embodiments, where left and right exclusion zones are established based on orientation of an electronic system 150, determination module 320 may re-establish new exclusion zones on the new left and new right in response to an orientation input indicating a rotation of electronic device 150 (and input device 100) by 90 degrees clockwise, by 90 degrees counterclockwise, or by 180 degrees.

In some embodiments, the exclusion criteria are selected so that an input which meets the exclusion criteria is most likely associated with a palm or portion of a palm that is overlapping a sensing region 120 of an input device 100. Once an input which meets these criteria is excluded, determination module 320 operates to determine if there is an associated input (e.g., from a thumb that is attached to the palm) present, and if so whether it should also be excluded. In one embodiment where this occurs, determination module 320 detects a second input within same transcapacitive image and then determines an orientation of the major axis of the second input. In response to the major axis of the second input pointing in a line toward the first input (which has been excluded), the second input is presumed to be a thumb attached to and associated with the excluded palm. In some embodiments, in addition to the major axis pointing toward the first excluded input, the second input must also have a high aspect ratio that meets or exceeds a pre-established threshold (e.g., an aspect ratio of 1.8 or higher), thus indicating it more elongated (like the side edge of a thumb) than round (like the tip of a finger) if it is to be excluded from consideration as a valid input. In some embodiments, in addition to the major axis pointing toward the first excluded input, the second input must also have a centroid within a certain distance or number of pixels from either and edge or a centroid of the first excluded input (e.g., centroids no more than 10 cm apart) if it is to be excluded from consideration as a valid input. In some embodiments, determination module 320 automatically excludes from consideration as a valid input any input that is determined to be an associated thumb input. In other embodiments, determination module 320 will exclude a second input that is an associated thumb input from being considered as a valid input only while its movement remains either substantially stationary or else below some velocity threshold. Above the velocity threshold, it is assumed that a user may be trying to make a valid input, such as swiping motion, with an associated thumb (or other digit). That is, a currently excluded second input (e.g., from a thumb) can transition from an excluded input to an included input if its velocity later fails to stay below the velocity threshold.

In the same manner that a grip input from a palm or a portion thereof near one edge (i.e. a "first edge") of an input device 100 is detected and excluded, determination module 320 can similarly detect and exclude a grip input from a palm or portion thereof that occurs along another edge of input device 100. Determination module 320 has previously analyzed the locations and intensity of the capacitive pixels in a transcapacitive image. If another input is detected along another, different edge of sensing region 120 of input device 100 (different than the first edge along which the first input was detected), then determination module 320 operates to determine whether this additional detected input should also be excluded from consideration as a valid user input. The different edge may be opposite or adjacent to the first edge that was previously discussed. To do this, determination module 320 determines if this additional detected input satisfies exclusion criteria which would indicate that it should be excluded. For example, if this input abuts another edge of sensing region 120 of input device 100 or else begins within certain distance or certain number of pixels of this other edge of sensing region 120, it is screened against two or more exclusion criteria. In one embodiment, determination module 320 determines whether the input exceeds a minimum size criterion (e.g., an area greater than a preset number of capacitive pixels) and determines whether the aspect ratio is at or higher than a preset aspect ratio criterion. In some embodiments, other exclusion criteria must also be met, such as having a centroid within a defined exclusion zone. In one embodiment, in response to this additional input satisfying all of the applied exclusion criteria, determination module 320 excludes this additional input from consideration as a valid input. Moreover, as discussed above, determination module 320 can also determine if an associated thumb input is present and, if so, whether it should also be excluded from consideration as a valid input.

Other detected inputs that are not excluded from consideration as valid inputs are treated as valid inputs and processed accordingly. This does not preclude additional processing from filtering out these other inputs. In some embodiments, grip inputs (e.g., palm and/or palm and associated thumb) are detected and excluded before other inputs) noted in a sensing region 120 of an input device 100 are processed.

Depictions of Some Examples of Input Detection and Exclusion

Figure 4A:
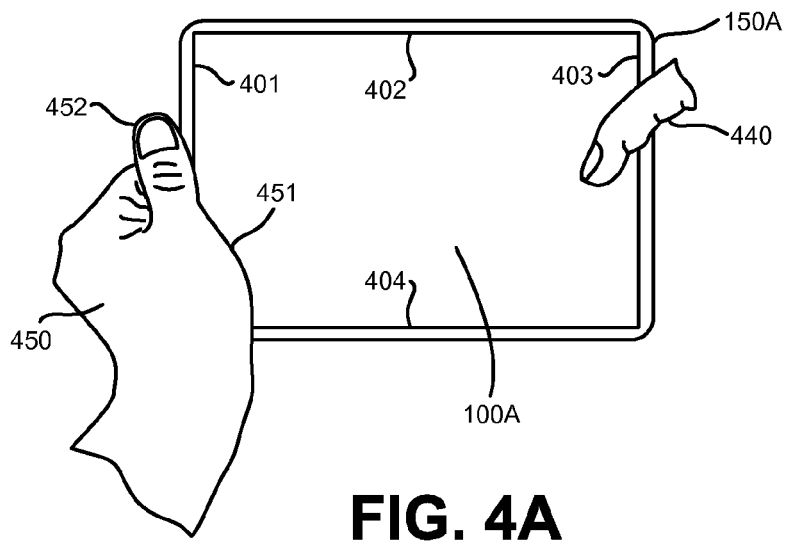
FIGS. 4A, 4B, and 4C depict techniques for input detection and exclusion, according to various embodiments.
Figure 4B:
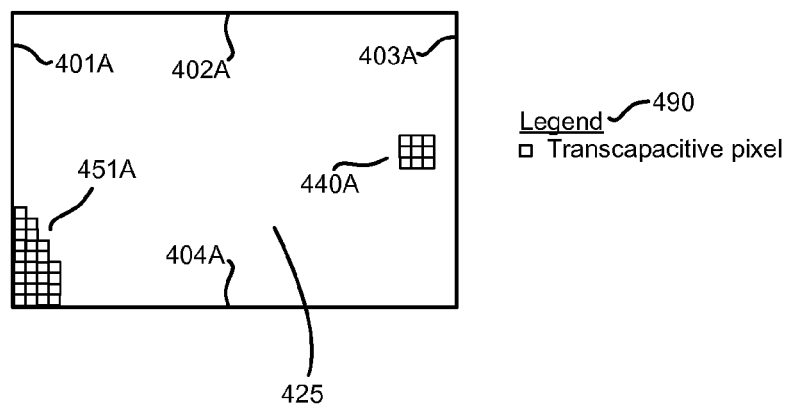
Figure 4C:
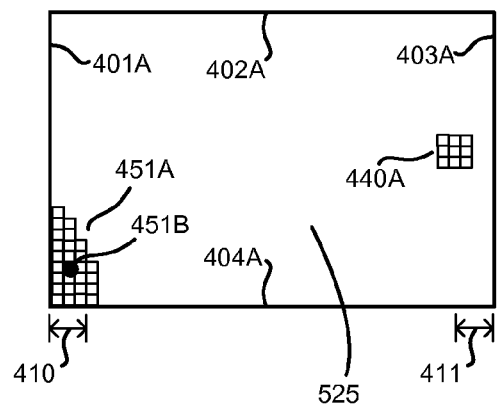

FIGS. 4A, 4B, and 4C depict techniques for input detection and exclusion, according to various embodiments. With reference to FIG. 4A, an electronic device 150A (e.g., a tablet computer) having an input device 100A is illustrated. As depicted, input device 100A is a touch screen that also displays graphic information. Input device 100A is rectangular and composed of four edges 401, 402, 403, and 404. The orientation of electronic device 150A is such that edge 401 is the left edge, edge 402 is the top edge, edge 403 is the right edge, and edge 404 is the bottom edge. The left hand 450 of a user is shown gripping electronic device 150A in a manner that causes palm 451 to partially overlap input device 100A. Thumb 452 of hand 450 is not overlapping input device 100A. A finger 440 (e.g., from the right hand of the user) is shown providing input to input device 100A. Input device 100A includes a sensing region 120 which is not depicted, but overlaps and is bounded by the two-dimensional space defined by edges 401, 402, 403, and 404. Although FIGS. 4B and 4C discuss capacitive input devices as example implementations, input device 100A may utilize other types of input sensing discussed herein.

Referring now to FIG. 4B, a visual depiction is shown of the capacitive pixels of a capacitive image 425 captured from the input illustrated in FIG. 4A. Though discussed below as being a transcapacitive image, capacitive image 425 may be an absolute capacitive image, a transcapacitive image, or a hybrid capacitive image (formed from a combination of transcapacitive measurements and absolute capacitive measurements). Edges 401A, 402A, 403A, and 404A respectively correspond to edges 401, 402, 403, and 404 of FIG. 4A. As illustrated by legend 490, each small box represents a capacitive pixel associated with a detected input. Grouping of capacitive pixels 451A correspond to input detected from palm 451 in FIG. 4A, while grouping of capacitive pixels 440A correspond to input detected from the tip of finger 440 in FIG. 4A. For purposes of clarity of illustration, transcapacitive image 425 has been filtered to only show capacitive pixels over a threshold of intensity that is associated with the presence of input objects relative to input device 100A; additionally the capacitive pixels are shown without depiction of shading that could be used to indicate an intensity magnitude that is associated with individual pixels.

Referring now to FIG. 4C, transcapacitive image 425 is shown with annotations of exclusion zones 410 and 411 which may be utilized in some embodiments. As depicted here, exclusion zones 410 and 411 are each three capacitive pixels wide measured from the left edge 401 and right edge 403 respectively. Exclusion zones of other widths may be used, and exclusion zones relative to the top edge 402 and/or bottom edge 404 may similarly be implemented. Additionally, a centroid 451B of grouping of capacitive pixels 451A is illustrated. According to one embodiment, exclusion criteria may include an input beginning on or within a certain distance of an edge, exceeding a minimum size (e.g., 15 square pixels), and exceeding a minimum aspect ratio (e.g. 1.5). Grouping of capacitive pixels 451A satisfies both the minimum size criterion and the minimum aspect ratio criterion of this example. If these were the only criteria being applied, determination module 320 would eliminate grouping of capacitive pixels 451A from consideration as a valid input. Grouping of capacitive pixels 440A satisfies neither of these criteria for exclusion and may be omitted from consideration for exclusion after failing to satisfy either of the criteria. Further, in some embodiments one or more additional exclusion criteria may be applied to a grouping of capacitive pixels, such as location of a centroid within a designated exclusion zone. As centroid 451B falls within exclusion zone 410, grouping of capacitive pixels 451A also satisfies this criterion and would thus be excluded from consideration as a valid input by determination module 320.

Figure 5A:
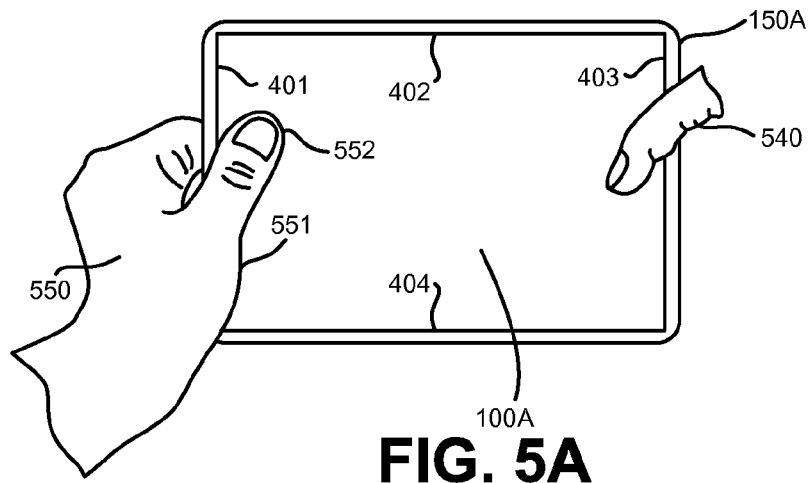
FIGS. 5A, 5B, and 5C depict techniques for input detection and exclusion, according to various embodiments.
Figure 5B:
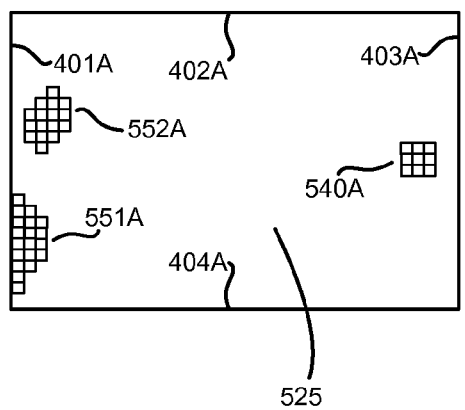
Figure 5C:
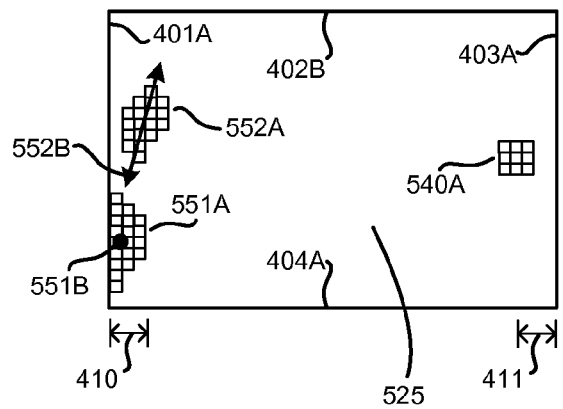

FIGS. 5A, 5B, and 5C depict techniques for input detection and exclusion, according to various embodiments. With reference to FIG. 5A, an electronic device 150A (e.g., a tablet computer) having an input device 100A is illustrated. As depicted, input device 100A is a touch screen that also displays graphic information. Input device 100A is rectangular and composed of four edges 401, 402, 403, and 404. The orientation of electronic device 150A is such that edge 401 is the left edge, edge 402 is the top edge, edge 403 is the right edge, and edge 404 is the bottom edge. The left hand 550 of a user is shown gripping electronic device 150A in a manner that causes palm 551 to partially overlap input device 100A and thumb 552 of hand 550 to rest on input device 100A. A finger 540 (e.g., from the right hand of the user) is shown providing input to input device 100A. Input device 100A includes a sensing region 120 which is not depicted, but overlaps and is bounded by the two-dimensional space defined by edges 401, 402, 403, and 404. Although FIGS. 5B and 5C discuss capacitive input devices as example implementations, input device 100A may utilize other types of input sensing discussed herein.

Referring now to FIG. 5B, a visual depiction is shown of the capacitive pixels of a transcapacitive image 525 captured from the input illustrated in FIG. 5A. Edges 401A, 402A, 403A, and 404A respectively correspond to edges 401, 402, 403, and 404 of FIG. 5A. As previously illustrated by legend 490 of FIG. 4B, each small box represents a capacitive pixel associated with a detected input. Grouping of capacitive pixels 551A correspond to input detected from palm 551 in FIG. 5A, grouping of capacitive pixels 552A correspond to input detected from thumb 552 in FIG. 5A, and grouping of capacitive pixels 540A correspond to input detected from the tip of finger 540 in FIG. 5A. For purposes of clarity of illustration, transcapacitive image 525 has been filtered to only show capacitive pixels over a threshold of intensity that is associated with the presence of input objects relative to input device 100A; additionally the capacitive pixels are shown without depiction of shading that could be used to indicate an intensity magnitude that is associated with individual pixels.

Referring now to FIG. 5C, transcapacitive image 525 is shown with annotations of exclusion zones 410 and 411 which may be utilized in some embodiments. As depicted here, exclusion zones 410 and 411 are each three capacitive pixels wide measured from the left edge 401 and right edge 403 respectively. Exclusion zones of other widths may be used, and exclusion zones relative to the top edge 402 and/or bottom edge 404 may similarly be implemented. Additionally, a centroid 551B of grouping of capacitive pixels 551A is illustrated. According to one embodiment, exclusion criteria may include an input beginning on or within a certain distance of an edge, exceeding a minimum size (e.g., 15 square pixels), and exceeding a minimum aspect ratio (e.g. 1.5). Grouping of capacitive pixels 551A satisfies both the minimum size criterion and the minimum aspect ratio criterion of this example. If these were the only criteria being applied, determination module 320 would eliminate grouping of capacitive pixels 551A from consideration as a valid input. Grouping of capacitive pixels 540A satisfies neither of these criteria for exclusion and may be omitted from consideration for exclusion after failing to satisfy either of the criteria. Further, in some embodiments one or more additional exclusion criteria may be applied to a grouping of capacitive pixels, such as location of a centroid within a designated exclusion zone. As centroid 551B falls within exclusion zone 410, grouping of capacitive pixels 551A also satisfies this criterion and would thus be excluded from consideration as a valid input by determination module 320.

Once grouping of capacitive pixels 551A is excluded, determination module 320 then operates to determine if an associated input (e.g., a thumb input) should also be excluded. As previously discussed one or more criteria can be applied to determine if a grouping of capacitive pixels such as grouping of capacitive pixels 552A should be associated with grouping of capacitive pixels 551A. For example, determination module 320 establishes a major axis 552B (along the longest dimension) of the grouping of capacitive pixels 552A and determines whether it points generally toward grouping of capacitive pixels 551A. In the illustrated example it does, and this indicates that grouping of capacitive pixels 552A and grouping of capacitive pixels 552A should be associated with one another, and that grouping of capacitive pixels 552A should be excluded from consideration as a valid input. In some embodiments, other criteria such as one or more of a minimum size criterion applied to a grouping of pixels, a minimum aspect ratio criterion applied to a grouping of pixels, or a maximum distance criterion for the separation between two groupings of pixels may additionally or alternatively be applied by determination module 320. As discussed previously, aspect ratio may be determined by measuring a span along the semi-major axis 552B and dividing this by a span measured along a semi-minor axis, which may be an axis orthogonal to semi-major axis 552B.

In some embodiments, a motion criterion may be considered with respect to an otherwise "associated" grouping of capacitive pixels, such as capacitive pixels 552A. For example, if the input associated with grouping of capacitive pixels 552A is stationary or below a certain velocity threshold (e.g., less than 3 cm/second) and other applied criteria are satisfied, then determination module 320 excludes grouping of capacitive pixels 552A from consideration as a valid input for as long as all criteria including the motion criterion remain satisfied.

Figure 6A:
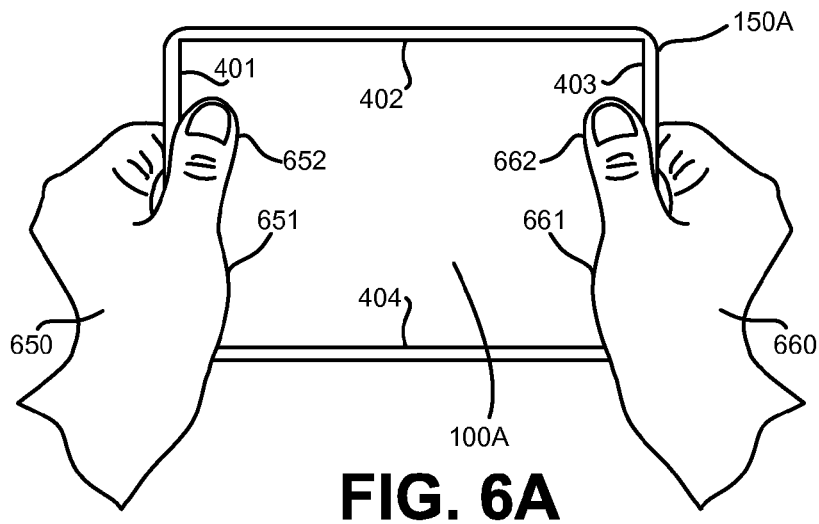
FIGS. 6A, 6B, and 6C depict techniques for input detection and exclusion, according to various embodiments.
Figure 6B:
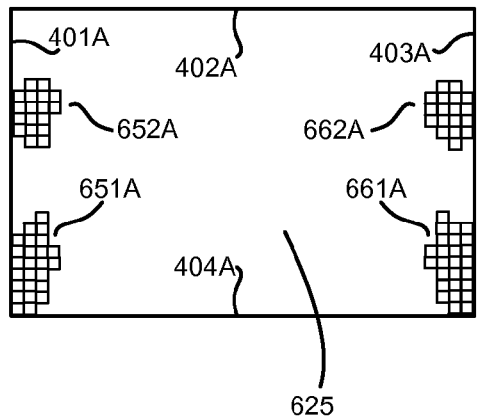
Figure 6C:
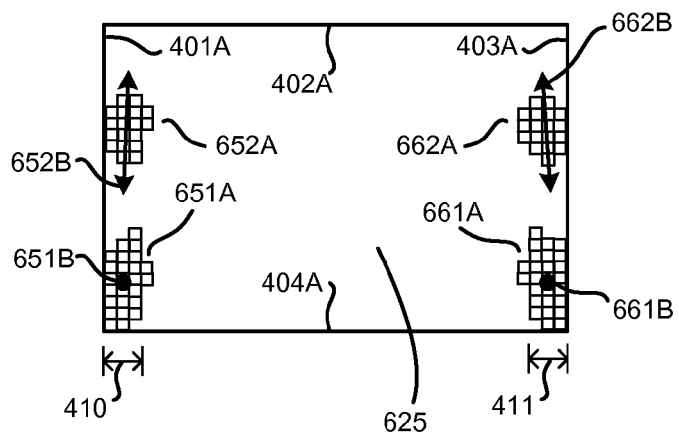

FIGS. 6A, 6B, and 6C depict techniques for input detection and exclusion, according to various embodiments. With reference to FIG. 6A, an electronic device 150A (e.g., a tablet computer) having an input device 100A is illustrated. As depicted, input device 100A is a touch screen that also displays graphic information. Input device 100A is rectangular and composed of four edges 401, 402, 403, and 404. The orientation of electronic device 150A is such that edge 401 is the left edge, edge 402 is the top edge, edge 403 is the right edge, and edge 404 is the bottom edge. The left hand 650 of a user is shown gripping electronic device 150A in a manner that causes palm 651 to partially overlap input device 100A and thumb 652 of hand 650 to rest on input device 100A. The right hand 660 of a user is shown gripping electronic device 150A in a manner that causes palm 661 to partially overlap input device 100A and thumb 662 of hand 660 to rest on input device 100A. Input device 100A includes a sensing region 120 which is not depicted, but overlaps and is bounded by the two-dimensional space defined by edges 401, 402, 403, and 404. Although FIGS. 6B and 6C discuss capacitive input devices as example implementations, input device 100A may utilize other types of input sensing discussed herein.

Referring now to FIG. 6B, a visual depiction is shown of the capacitive pixels of a transcapacitive image 625 captured from the input illustrated in FIG. 6A. Edges 401A, 402A, 403A, and 404A respectively correspond to edges 401, 402, 403, and 404 of FIG. 6A. As previously illustrated by legend 490 in FIG. 4B, each small box represents a capacitive pixel associated with a detected input. Grouping of capacitive pixels 651A correspond to input detected from palm 651 in FIG. 6A, grouping of capacitive pixels 652A correspond to input detected from thumb 652 in FIG. 6A, grouping of capacitive pixels 661A correspond to input detected from palm 661 in FIG. 6A, and grouping of capacitive pixels 662A correspond to input detected from thumb 662 in FIG. 6A. For purposes of clarity of illustration, transcapacitive image 625 has been filtered to only show capacitive pixels over a threshold of intensity that is associated with the presence of input objects relative to input device 100A; additionally the capacitive pixels are shown without depiction of shading that could be used to indicate an intensity magnitude that is associated with individual pixels.

Referring now to FIG. 6C, transcapacitive image 625 is shown with annotations of exclusion zones 410 and 411 which may be utilized in some embodiments. As depicted here, exclusion zones 410 and 411 are each three capacitive pixels wide measured from the left edge 401 and right edge 403 respectively. Exclusion zones of other widths may be used, and exclusion zones relative to the top edge 402 and/or bottom edge 404 may similarly be implemented. Additionally, a centroid 651B of grouping of capacitive pixels 651A is illustrated, as is a centroid 661B of grouping of pixels 661A. According to one embodiment, exclusion criteria may include an input beginning on or within a certain distance of an edge, exceeding a minimum size (e.g., 15 square pixels), and exceeding a minimum aspect ratio (e.g. 1.5). Grouping of capacitive pixels 651A and grouping of pixels 661A each satisfy both the minimum size criterion and the minimum aspect ratio criterion (of this example). If these were the only criteria being applied, determination module 320 would eliminate grouping of capacitive pixels 651A and grouping of pixels 661A from consideration as valid inputs. Further, in some embodiments one or more additional exclusion criteria may be applied to a grouping of capacitive pixels, such as location of a centroid within a designated exclusion zone. As centroid 651B falls within exclusion zone 410, grouping of capacitive pixels 651A also satisfies this centroid location criterion and would thus be excluded from consideration as a valid input by determination module 320. Likewise, as centroid 661B falls within exclusion zone 411, grouping of capacitive pixels 661A also satisfies this centroid location criterion and would thus be excluded from consideration as a valid input by determination module 320.

Once grouping of capacitive pixels 651A is excluded, determination module 320 then operates to determine if an associated input (e.g., a thumb input) should also be excluded. As previously discussed one or more criteria can be applied to determine if a grouping of capacitive pixels such as grouping of capacitive pixels 652A should be associated with grouping of capacitive pixels 651A. For example, determination module 320 establishes a major axis 652B (along the longest dimension) of the grouping of capacitive pixels 652A and determines whether it points generally toward grouping of capacitive pixels 651A. In the illustrated example it does, and this indicates that grouping of capacitive pixels 652A and grouping of capacitive pixels 652A should be associated with one another, and that grouping of capacitive pixels 652A should be excluded from consideration as a valid input. In some embodiments, other criteria such as one or more of a minimum size or minimum aspect ratio may additionally or alternatively be applied by determination module 320. As discussed previously, aspect ratio may be determined by measuring a span along the semi-major axis 652B and dividing this by a span measured along a semi-minor axis, which may be an axis orthogonal to semi-major axis 652B.

Once grouping of capacitive pixels 661A is excluded, determination module 320 then operates to determine if an associated input (e.g., a thumb input) should also be excluded. As previously discussed one or more criteria can be applied to determine if a grouping of capacitive pixels such as grouping of capacitive pixels 662A should be associated with grouping of capacitive pixels 661A. For example, determination module 320 establishes a major axis 662B (along the longest dimension) of the grouping of capacitive pixels 662A and determines whether it points generally toward grouping of capacitive pixels 661A. In the illustrated example it does, and this indicates that grouping of capacitive pixels 662A and grouping of capacitive pixels 662A should be associated with one another, and that grouping of capacitive pixels 662A should be excluded from consideration as a valid input. In some embodiments, other criteria such as one or more of a minimum size or minimum aspect ratio may additionally or alternatively be applied by determination module 320. As discussed previously, aspect ratio may be determined by measuring a span along the semi-major axis 662B and dividing this by a span measured along a semi-minor axis, which may be an axis orthogonal to semi-major axis 662B.

In some embodiments, a motion criterion may be considered with respect to an otherwise "associated" grouping of capacitive pixels, such as capacitive pixels 652A and/or 662A. The purpose is to exclude from consideration an associated input that is stationary or relatively stationary, but include an otherwise associated input in consideration as valid input if it is moving at a speed that would indicate a swiping or other input to input device 100A. For example, if the input associated with grouping of capacitive pixels 652A is stationary or below a certain velocity threshold (e.g., less than 3 cm/second) and other applied criteria are satisfied, then determination module 320 excludes grouping of capacitive pixels 652A from consideration as a valid input for as long as all criteria including the motion criterion remain satisfied. Conversely, for example, if the input associated with grouping of capacitive pixels 662A is noted as moving at or above the same velocity threshold (e.g., moving at or greater than 3 cm/second) and other applied criteria are satisfied, then determination module 320 does not exclude grouping of capacitive pixels 652A from consideration as a valid input while the motion criterion remains unsatisfied.

Figure 7A:
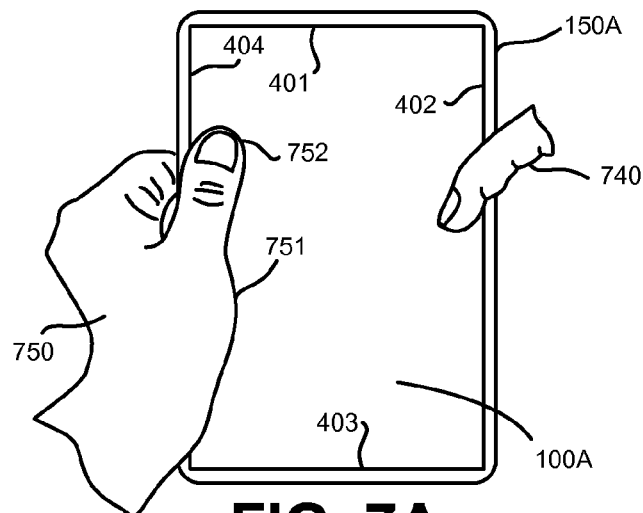
FIGS. 7A, 7B, and 7C depict techniques for input detection and exclusion, according to various embodiments.
Figure 7B:
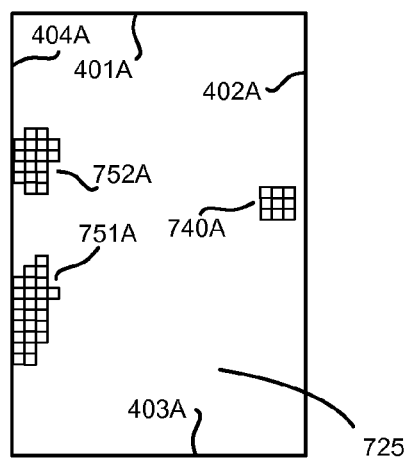
Figure 7C:
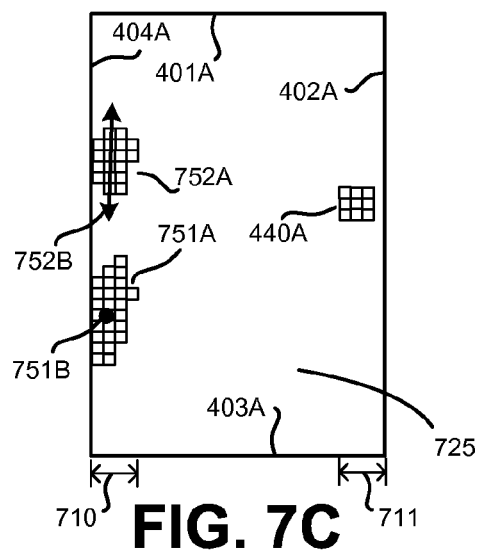

FIGS. 7A, 7B, and 7C depict techniques for input detection and exclusion, according to various embodiments. FIGS. 7A, 7B, and 7C are similar to FIGS. 5A, 5B, and 5C except that electronic device 150A has been rotated 90 degrees clockwise. Based on orientation input from electronic system 150A, determination module reestablishes labels associated with edges 401, 402, 403, and 404 such that edge 404 is a left edge of input device 100A, edge 401 is a top edge of input device 100A, edge 403 is a right edge of input device 100A, and edge 403 is a bottom edge of input device 100A.

In FIG. 7A, the left hand 750 of a user is shown gripping electronic device 150A in a manner that causes palm 751 to partially overlap input device 100A and thumb 752 of hand 750 to rest on input device 100A. A finger 740 (e.g., from the right hand of the user) is shown providing input to input device 100A. Input device 100A includes a sensing region 120 which is not depicted, but overlaps and is bounded by the two-dimensional space defined by edges 401, 402, 403, and 404. Although FIGS. 7B and 7C discuss capacitive input devices as example implementations, input device 100A may utilize other types of input sensing discussed herein.

Referring now to FIG. 7B, a visual depiction is shown of the capacitive pixels of a transcapacitive image 725 captured from the input illustrated in FIG. 7A. Edges 401A, 402A, 403A, and 404A respectively correspond to edges 401, 402, 403, and 404 of FIG. 7A. As previously illustrated by legend 490 of FIG. 4B, each small box represents a capacitive pixel associated with a detected input. Grouping of capacitive pixels 751A correspond to input detected from palm 751 in FIG. 7A, grouping of capacitive pixels 752A correspond to input detected from thumb 752 in FIG. 7A, and grouping of capacitive pixels 740A correspond to input detected from the tip of finger 740 in FIG. 7A. For purposes of clarity of illustration, transcapacitive image 725 has been filtered to only show capacitive pixels over a threshold of intensity that is associated with the presence of input objects relative to input device 100A; additionally the capacitive pixels are shown without depiction of shading that could be used to indicate an intensity magnitude that is associated with individual pixels.

Referring now to FIG. 7C, transcapacitive image 725 is shown with annotations of exclusion zones 710 and 711 which may be utilized in some embodiments. As depicted here, exclusion zones 710 and 711 are each four capacitive pixels wide measured from the left edge 404 and right edge 402 respectively. This illustrates that both the presence of the exclusion zone and parameters, such as the width, of the exclusion zones may be set based upon the orientation of input device 100A. Exclusion zones of other widths may be used, and exclusion zones relative to the top edge 401 and/or bottom edge 403 may similarly be implemented. Additionally, a centroid 751B of grouping of capacitive pixels 751A is illustrated. According to one embodiment, exclusion criteria may include an input beginning on or within a certain distance of an edge, exceeding a minimum size (e.g., 20 square pixels), and exceeding a minimum aspect ratio (e.g. 1.6). It should be appreciated that one or both of the minimum size and minimum aspect criterion may be varied based on the orientation of electronic device 150. Grouping of capacitive pixels 751A satisfies both the minimum size criterion and the minimum aspect ratio criterion of this example. If these were the only criteria being applied, determination module 320 would eliminate grouping of capacitive pixels 751A from consideration as a valid input. Grouping of capacitive pixels 740A satisfies neither of these criteria for exclusion and may be omitted from consideration for exclusion after failing to satisfy either of the criteria. Further, in some embodiments one or more additional exclusion criteria may be applied to a grouping of capacitive pixels, such as location of a centroid within a designated exclusion zone. As centroid 751B falls within exclusion zone 710, grouping of capacitive pixels 751A also satisfies this centroid location criterion and would thus be excluded from consideration as a valid input by determination module 320.

Once grouping of capacitive pixels 751A is excluded, determination module 320 then operates to determine if an associated input (e.g., a thumb input) should also be excluded. As previously discussed one or more criteria can be applied to determine if a grouping of capacitive pixels such as grouping of capacitive pixels 752A should be associated with grouping of capacitive pixels 751A. For example, determination module 320 establishes a major axis 752B (along the longest dimension) of the grouping of capacitive pixels 752A and determines whether it points generally toward grouping of capacitive pixels 751A. In the illustrated example it does, and this indicates that grouping of capacitive pixels 752A and grouping of capacitive pixels 752A should be associated with one another, and that grouping of capacitive pixels 752A should be excluded from consideration as a valid input. In some embodiments, other criteria such as one or more of a minimum size criterion or a minimum aspect ratio criterion may additionally or alternatively be applied by determination module 320. As discussed previously, aspect ratio may be determined by measuring a span along the semi-major axis 752B and dividing this by a span measured along a semi-minor axis, which may be an axis orthogonal to semi-major axis 752B.

In some embodiments, a motion criterion may be analyzed with respect to an otherwise "associated" grouping of capacitive pixels, such as capacitive pixels 752A. The motion criterion may also be varied based on the orientation of electronic device 150A. For example, if the input associated with grouping of capacitive pixels 752A is stationary or below a certain velocity threshold (e.g., less than 2.5 cm/second) and other applied criteria are satisfied, then determination module 320 excludes grouping of capacitive pixels 752A from consideration as a valid input for as long as all criteria including the motion criterion remain satisfied.

Example Methods of Operation

Figure 8A:
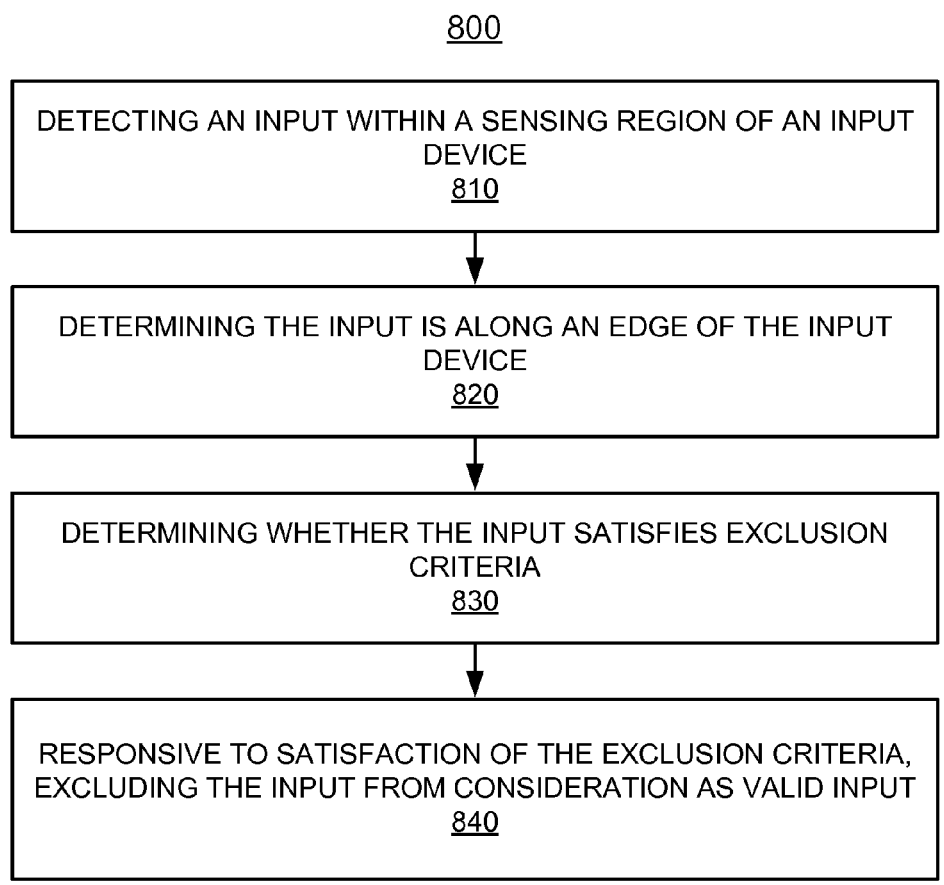
FIGS. 8A, 8B, and 8C illustrate a flow diagram of an example method of input sensing and exclusion, according to various embodiments.
Figure 8B:
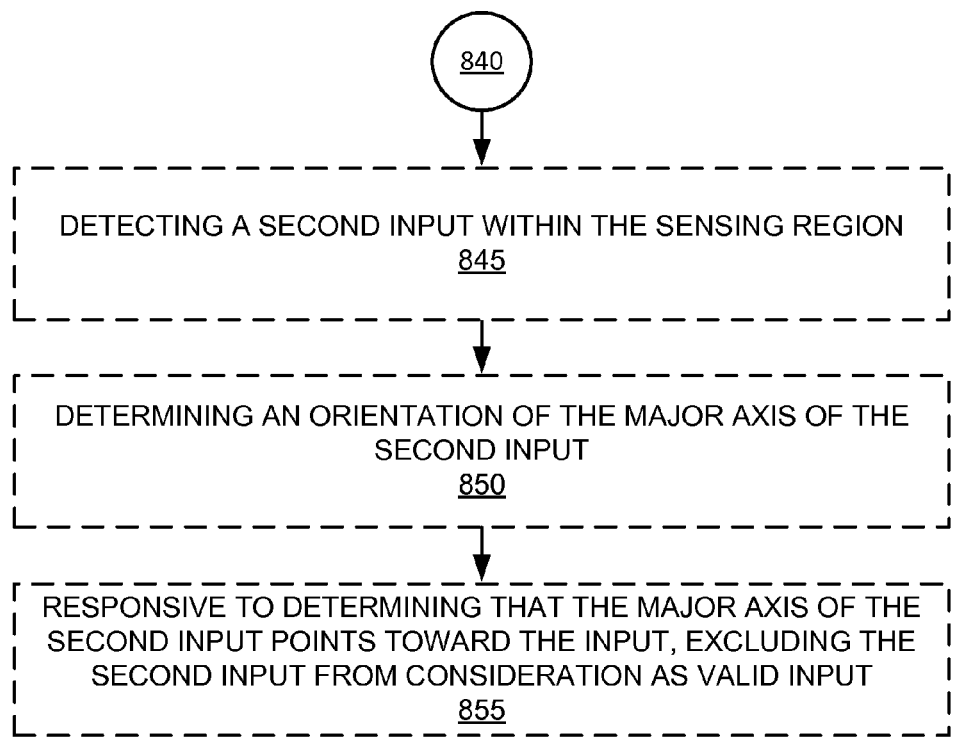
Figure 8C:
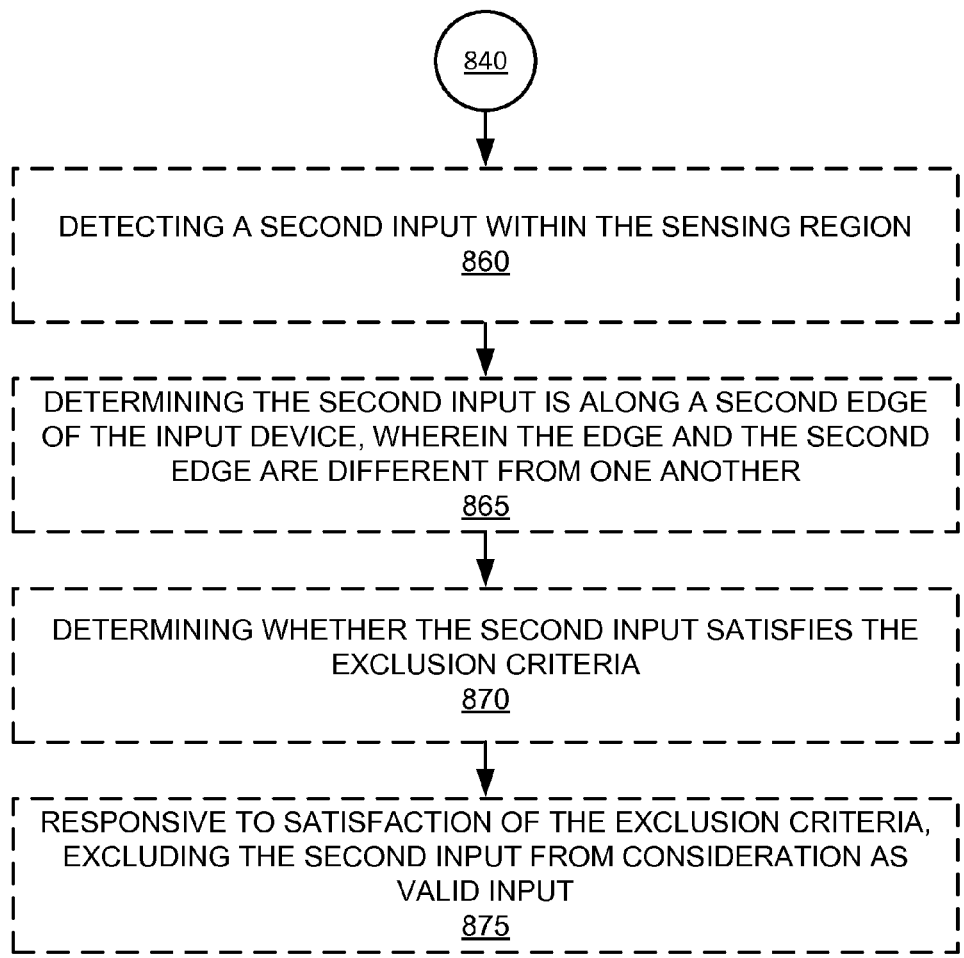

FIGS. 8A, 8B, and 8C illustrate a flow diagram 800 of an example method of input sensing and exclusion, according to various embodiments. Procedures of this method will be described with reference to elements and/or components of one or more of FIGS. 1-7C. It is appreciated that in some embodiments, the procedures may be performed in a different order than described, that some of the described procedures may not be performed, and/or that one or more additional procedures to those described may be performed.

With reference to FIG. 8A, at procedure 810 of flow diagram 800, in one embodiment, an input is detected within an input device. Processing system 110A and in particular sensor module 310 accomplish this through coupling with an input device 100 (e.g., 100A of FIGS. 4A, 5A, 6A, and 7A). It is appreciated that in various embodiments the input is detected through transcapacitive sensing and the use of a transcapacitive image, but that other types of input sensing discussed herein may be utilized in other embodiments.

With continued reference to FIG. 8A, at procedure 820 of flow diagram 800, in one embodiment, the method determines the input is along an edge of the input device. Processing system 110A and in particular determination module 320 accomplish this procedure. For example, if the input abuts at an edge of a sensing region associated with an input device then it is determined to be along an edge of the input device that it abuts. Likewise, in some embodiments, if an input begins within a certain distance, which may be defined by a certain number of capacitive pixels, from the edge of an input device, then it may also be considered to be along that edge of the input device.

With continued reference to FIG. 8A, at procedure 830 of flow diagram 800, in one embodiment, the method determines whether the input satisfies exclusion criteria. Processing system 110A and in particular determination module 320 accomplish this procedure. As previously discussed herein, some combination of exclusion criteria may be analyzed and required to be satisfied before exclusion takes place. Some examples which may be utilized alone or in combination include: a minimum size criterion, a minimum aspect ratio criterion, and a centroid location criterion (e.g., the centroid must be located within a predefined exclusion zone along an edge of a sensing region to satisfy the centroid location criterion). In some embodiments, the applied criteria are the minimum size criterion and the minimum aspect ratio criterion. In some embodiments, the applied criteria are the minimum size criterion, the minimum aspect ratio criterion, and the centroid location criterion. In some embodiments, the applied criteria are the minimum size criterion and the maximum distance between two groupings of pixels (e.g., between pixels associated with a gripping palm and pixels associated with an associated thumb) criterion. In other embodiments, one or more other additional or alternative criterions may be applied. In embodiments where a centroid location criterion is applied, a parameter of it may be set based on an orientation of the input device 100A. For example, if the exclusion zones are being set to the left and right edges of a sensing region of the input device 100A, then the orientation of the input device 100A determines which edges are considered left, right, top, and bottom. Similarly, a width parameter of the exclusion zone may be set differently based on the orientation of the input device 100A (see e.g., the examples illustrated and discussed in FIGS. 5A-5C and 7A-7C).

With continued reference to FIG. 8A, at procedure 840 of flow diagram 800, in one embodiment, responsive to satisfaction of the exclusion criteria, the method excludes the input from consideration as valid input. Processing system 110A and in particular determination module 320 accomplish this procedure. If a detected input does not satisfy the applied exclusion criteria, it is not excluded from consideration as valid input. Although this does not prevent follow-on filtering and analysis from excluding an input that otherwise does not meet all of the exclusion criteria.

With reference to FIG. 8B, as illustrated in procedure 845 of flow diagram 800, in some embodiments, the method as described in 810-840 further comprises detecting a second input within the sensing region. Processing system 110A and in particular sensor module 310 accomplish this through coupling with an input device 100 (e.g., 100A of FIGS. 5A and 7A). It is appreciated that in various embodiments the input is detected through transcapacitive sensing and the use of a transcapacitive image, but that other types of input sensing discussed herein may be utilized in other embodiments. That is, the method described in flow diagram 800 can be applied to a transcapacitive image, an absolute capacitive image, or a hybrid capacitive image (constructed from a combination of transcapacitive measurements and absolute capacitive measurements).

With continued reference to FIG. 8B, as illustrated in procedure 850 of flow diagram 800, in some embodiments, the method determines an orientation of the major axis of the second input. Processing system 110A and in particular determination module 320 accomplish this procedure. The major axis is typically the longest axis of, for example, a grouping of capacitive pixels that make up the input. In some embodiments, an aspect ratio (span of semi-major axis divided by span of semi-minor axis) of the second input is also determined. If the applied criteria are satisfied, then the second input is categorized as being associated with the first input. For example, it may be categorized as input from a palm that generates the first input. Reference is made to the examples illustrated in FIGS. 5A-5C and 7A-7C for further discussion of this procedure.

With continued reference to FIG. 8B, as illustrated in procedure 855 of flow diagram 800, in some embodiments, responsive to determining that the major axis of the second input points toward the input, the method as described in 800-0845 further comprises, excluding the second input from consideration as valid input. Processing system 110A and in particular determination module 320 accomplish this procedure. If a detected input does not satisfy the applied exclusion criteria, it is not excluded from consideration as valid input. Although this does not prevent follow-on filtering and analysis from excluding an input that otherwise does not meet all of the exclusion criteria. Reference is made to the examples illustrated in FIGS. 5A-5C and 7A-7C for further discussion of this procedure with respect to input associated with thumb 552 and thumb 752.

In some embodiments, even if the preliminary criterion or criteria applied to the second input are satisfied an additional motion criterion may be analyzed with respect to the second input before determining whether to exclude the second input from consideration as a valid input. For example, if the second input is also stationary or moving at less than some preset velocity threshold then it will be excluded from consideration as valid input while its velocity remains below the preset velocity threshold. However, if the second input is moving at velocity that is at or above the preset velocity threshold or else begins moving at a velocity that is at or above the preset velocity threshold then it will not be excluded from consideration as a valid input.

With reference to FIG. 8C, as illustrated in procedure 860 of flow diagram 800, in some embodiments, the method as described in 810-840 further comprises detecting a second input within the sensing region. Processing system 110A and in particular sensor module 310 accomplish this through coupling with an input device 100 (e.g., 100A of FIGS. 4A, 5A, 6A, and 7A). It is appreciated that in various embodiments the input is detected through transcapacitive sensing and the use of a transcapacitive image, but that other types of input sensing discussed herein may be utilized in other embodiments.

With continued reference to FIG. 8C, as illustrated in procedure 865 of flow diagram 800, in some embodiments the method determines the second input is along a second edge of the input device, wherein the edge and the second edge are different from one another. Processing system 110A and in particular determination module 320 accomplish this procedure. For example, if the second input abuts at an edge of a sensing region associated with an input device then it is determined to be along an edge of the input device that it abuts. Likewise, in some embodiments, if the second input begins within a certain distance, which may be defined by a certain number of capacitive pixels, from the edge of an input device, then it may also be considered to be along that edge of the input device. Reference is made to the example illustrated in FIGS. 6A, 6B, and 6C which show palms 651 and 661 providing input on opposing left and right edges of sensing region associated with input device 100A.

With continued reference to FIG. 8C, as illustrated in procedure 870 of flow diagram 800, in some embodiments the method determines whether the second input satisfies the exclusion criteria. Processing system 110A and in particular determination module 320 accomplish this procedure. As previously discussed herein, some combination of exclusion criteria may be analyzed and required to be satisfied before exclusion takes place. Some examples which may be utilized alone or in combination include: a minimum size criterion, a minimum aspect ratio criterion, and a centroid location criterion (e.g., the centroid must be located within a predefined exclusion zone along an edge of a sensing region to satisfy the centroid location criterion). In some embodiments, the applied criteria are the minimum size criterion and the minimum aspect ratio criterion. In some embodiments, the applied criteria are the minimum size criterion, the minimum aspect ratio criterion, and the centroid location criterion. In other embodiments, one or more other additional or alternative criterions may be applied. In embodiments where a centroid location criterion is applied, a parameter of it may be set based on an orientation of the input device 100A. For example, if the exclusion zones are being set to the left and right edges of a sensing region of the input device 100A, then the orientation of the input device 100A determines which edges are considered left, right, top, and bottom. Similarly, a width parameter of the exclusion zone may be set differently based on the orientation of the input device 100A (see e.g., the examples illustrated and discussed in FIGS. 5A-5C and 7A-7C).

With continued reference to FIG. 8C, as illustrated in procedure 875 of flow responsive to satisfaction of the exclusion criteria, excluding the second input from consideration as valid input. Processing system 110A and in particular determination module 320 accomplish this procedure. If a detected second input does not satisfy the applied exclusion criteria, it is not excluded from consideration as valid input. Although this does not prevent follow-on filtering and analysis from excluding a second input that otherwise does not meet all of the exclusion criteria.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of input sensing and exclusion comprising:
    detecting a first input within a sensing region of an input device;
    determining said first input is along an edge of said input device;
    determining whether said first input, in and of itself, satisfies exclusion criteria;
    responsive to satisfaction of said exclusion criteria, excluding said first input from consideration as valid input;
    detecting a second input within said sensing region;
    determining an orientation of a major axis of said second input; and
    responsive to determining that said major axis of said second input points toward said first input, excluding said second input from consideration as valid input.

2. The method as recited in claim 1, wherein said excluding said second input from consideration as valid input comprises:
    excluding said second input from consideration as valid input while velocity of said second input remains below a velocity threshold.

3. The method as recited in claim 1, further comprising:
    detecting a third input within said sensing region;
    determining said third input is along a second edge of said input device, wherein said edge and said second edge are different from one another;
    determining whether said third input satisfies said exclusion criteria; and
    responsive to satisfaction of said exclusion criteria, excluding said third input from consideration as valid input.

4. The method as recited in claim 1, wherein said detecting said first input within a sensing region of an input device comprises:
    detecting said first input within a capacitive image associated with said sensing region.

5. The method of claim 1, wherein the exclusion criteria comprises:
    a centroid location criterion associated with a zone along said edge, wherein said zone is measured from said edge inward toward an opposite edge of said input device from said edge,
    a minimum size criterion, and
    an aspect ratio criterion.

6. The method as recited in claim 5, further comprising:
    establishing a parameter of said zone along said edge based upon an orientation of said input device.

7. A processing system for a capacitive sensing input device, said processing system comprising:
    a sensor module configured to acquire resulting signals from a plurality of sensor electrodes; and
    a determination module configured to:
        determine a capacitive image from said resulting signals;
        detect a first input within said capacitive image;
        determine said first input is along an edge of said input device;
        determine whether said first input, in and of itself, satisfies exclusion criteria;
        responsive to satisfaction of said exclusion criteria, excluding said input from consideration as valid input;
        detect a second input within said sensing region;
        determine an orientation of a major axis of said second input; and
        responsive to determining that said major axis of said second input points toward said first input, exclude said second input from consideration as valid input.

8. The processing system of claim 7, wherein said determination module is further configured to:
    exclude said second input from consideration as valid input only while velocity of said second input remains below a velocity threshold.

9. The processing system of claim 7, wherein said determination module is Further configured to:
    detect a third input within said image;
    determine said third input is along a second edge of said input device, wherein said edge and said second edge are different from one another;
    determine whether said third input satisfies said exclusion criteria; and
    responsive to satisfaction of said exclusion criteria, exclude said third input from consideration as valid input.

10. The processing system of claim 7, wherein the exclusion criteria comprises:
    a centroid location criterion associated with a zone along said edge, wherein said zone is measured from said edge inward toward an opposite edge of said input device from said edge,
    a minimum size criterion, and
    an aspect ratio criterion.

11. The processing system of claim 10, wherein said processing sysstem is further configured to:
    establish a parameter of said zone along said edge based upon an orientation of said input device.

12. A capacitive sensing input device comprising:
a plurality of sensor electrodes; and
a processing system coupled with said plurality of sensor electrodes, said processing system configured to:
acquire resulting signals by receiving with said plurality of sensor electrodes;
determine a capacitive image from said capacitive resulting signals;
detect a first input within said capacitive image;
determine said first input is along an edge of said input device;
determine whether said first input, in and of itself, satisfies exclusion criteria;
responsive to satisfaction of said exclusion criteria, exclude said first input from consideration as valid input;
detect a second input within said sensing region;
determine an orientation of a major axis of said second input; and
responsive to determining that said major axis of said second input points toward said first input, exclude said second input from consideration as valid input.

13. The capacitive sensing input device of claim 12, wherein said processing system is further configured to:
exclude said second input from consideration as valid input only while velocity of said second input remains below a velocity threshold.

14. The capacitive sensing input device of claim 12, wherein said processing system is further configured to:
detect a third input within said capacitive image;
determine said third input is along a second edge of said input device, wherein said edge and said second edge are different from one another;
determine whether said third input satisfies said exclusion criteria; and
responsive to satisfaction of said exclusion criteria, exclude said third input from consideration as valid input.

15. The capacitive sensing input device of claim 12, wherein the exclusion criteria comprises:
a centroid location criterion associated with a zone along said edge, wherein said zone is measured from said edge inward toward an opposite edge of said input device from said edge,
a minimum size criterion, and
an aspect ratio criterion.

16. The capacitive sensing input device of claim 15, wherein said processing system is further configured to:
establish a parameter of said zone along said edge based upon an orientation of said input device.

* * * * *